United States Patent
Wiman et al.

(10) Patent No.: US 6,217,263 B1
(45) Date of Patent: Apr. 17, 2001

(54) INDEXABLE INSERT FOR COPY TURNING HAVING A CUTTING CORNER FORMED BY CURVED SEGMENTS

(75) Inventors: Jörgen Wiman; Sven-Olov Lindstrom, both of Sandviken (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/326,679

(22) Filed: Jun. 7, 1999

(30) Foreign Application Priority Data

Jun. 5, 1998 (SE) .................................................. 9801995

(51) Int. Cl.$^7$ .................................................. B23B 27/06
(52) U.S. Cl. .................................................. 407/114; 407/115
(58) Field of Search .................................................. 407/113, 114, 407/115, 116, 103, 104

(56) References Cited

U.S. PATENT DOCUMENTS

| | | | |
|---|---|---|---|
| 3,777,341 | * 12/1973 | Faber | 407/114 |
| 5,147,159 | * 9/1992 | Lowe et al. | 407/114 |
| 5,222,843 | * 6/1993 | Katbi et al. | 407/114 |
| 5,388,932 | * 2/1995 | DeRoche et al. | 407/113 |
| 5,634,745 | 6/1997 | Wiman et al. | |
| 5,779,400 | * 7/1998 | Fountaine | 407/103 |

FOREIGN PATENT DOCUMENTS

| | | | |
|---|---|---|---|
| 3133941 | * 3/1983 | (DE) | 407/114 |
| 4309897 | * 8/1994 | (DE) | 407/114 |
| 1060321 | * 12/1983 | (SU) | 407/113 |
| 1397400 | * 6/1975 | (UA) | 407/114 |
| 2254026A | * 9/1992 | (UA) | 407/114 |
| WO 95/00272 | * 1/1995 | (WO) | 407/113 |

\* cited by examiner

*Primary Examiner*—A. L. Wellington
*Assistant Examiner*—Erica Ergenbright
(74) *Attorney, Agent, or Firm*—Burns, Doane, Swecker & Mathis, L.L.P.

(57) ABSTRACT

A rhombic shaped metal cutting insert is adapted for longitudinal turning and copy turning. Opposing nose corners of the insert form equal angles less than 60 degrees. A pair of side cutting edges converge toward each of the nose corners. The side cutting edges of each pair form obtuse angles with respective side cutting edges of the other pair. A longest diagonal extending through the insert intersects both of the nose corners and forms an acute angle relative to a diagonal which bisects both of the obtuse angles. Each nose corner has a corner cutting edge formed by a plurality of curved segments. First and second ones of those segments are disposed on opposite sides of the longest diagonal and together form an angle of about 90°. Situated between the first and second segments is a third segment which is intersected by the longest diagonal. Adjacently disposed ones of the curved segments at each corner have radii that are different from one another.

8 Claims, 4 Drawing Sheets

US 6,217,263 B1

INDEXABLE INSERT FOR COPY TURNING HAVING A CUTTING CORNER FORMED BY CURVED SEGMENTS

BACKGROUND OF THE INVENTION

The present invention relates to an indexable insert for copy turning with nose point angles less than 60°, which cutting insert has a rhombic basic form including an upper surface, and a bottom surface interconnected by side surfaces, wherein at least a part of the intersection lines between the side surfaces and the upper surface forms at least one main cutting edge, a secondary cutting edge and a curved corner cutting edge therebetween.

For copy turning nowadays, to a large extent, indexable inserts are used with nose point angles below 60°, wherein an ordinary value on the nose point angles is 55°, which enables application of the cutting inserts within a broad range. On the market nowadays a number of different types of indexable inserts with 55° nose point angle are found, among which types rhomboidic, rhombic and regular triangular indexable inserts can be mentioned.

In copy turning the following properties regarding feature and economy are desirable:

1) Good chip control, i.e., favorable chip guidance and chip breaking.
2) No movement of the cutting insert under impact of cutting forces.
3) Possibility to engage at 30° when inward copying is practiced.

When copy turning in certain materials or in slender work pieces and also in usage on unsteady machines and in internal metal working, low cutting forces and preferably a positive chip angle on the copying insert are desirable. Simultaneously there is a demand in modern machines that the copy turning insert to be used will be able to give the best possible surface finish of the machined surface. Sometimes surface finish can be improved by using higher cutting speed and neutral or positive rake angles. A certain sensitivity for the adjustment of the setting angle will however remain.

It is a purpose of the invention to achieve a new and improved indexable insert for copy turning to avoid or alleviate the problems of the prior art and which enables attainment of all the above indicated desirable properties at the same time as the feed can be increased considerably.

SUMMARY OF THE INVENTION

For the said purpose the invention provides an indexable insert, which is characterized by having its longest diagonal extending at an acute angle in relation to the diagonal extending through the obtuse angled corners and having the acute angled corners on the cutting insert designed with an asymmetric nose radius wherein said curved nose is divided in a number of circle or cylinder-surface segments with different radii in which adjacent segments always have different radii.

BRIEF DESCRIPTION OF THE DRAWINGS

The invention will be described in more detail in the following with reference to the enclosed drawings, wherefrom the features and advantages of the invention will become apparent.

DETAILED DESCRIPTION OF PREFERRED EMBODIMENTS OF THE INVENTION

Figure 1:
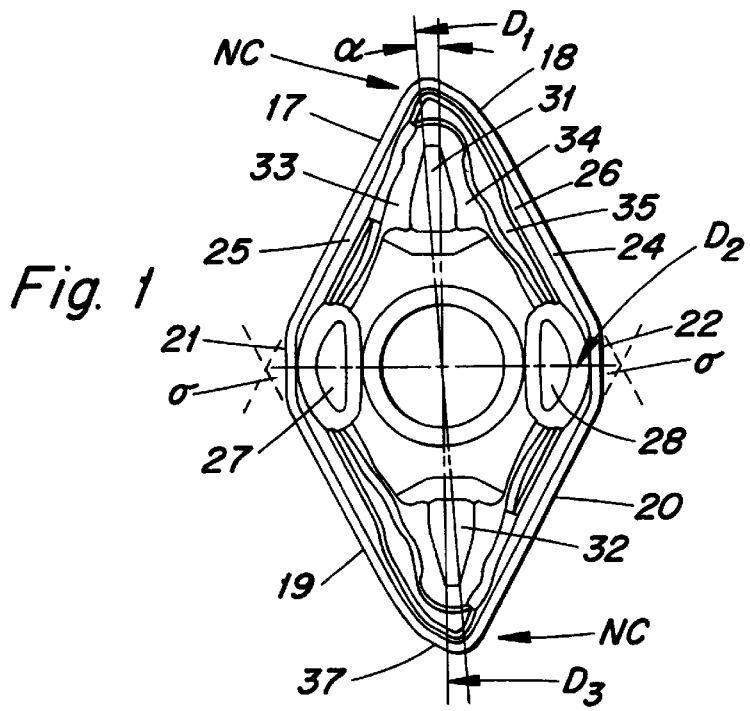
FIG. 1 is a plan view of a copying indexable insert according to the invention.
Figure 2:
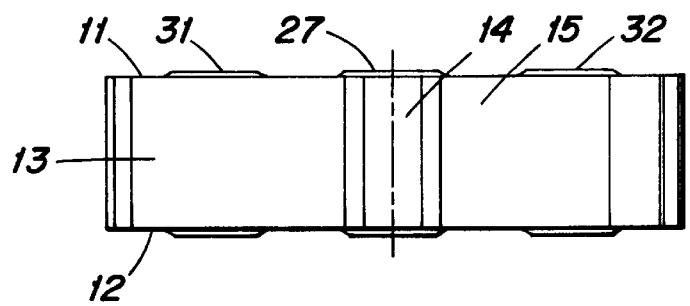
FIG. 2 is a side view of the cutting insert in FIG. 1.
Figure 3:
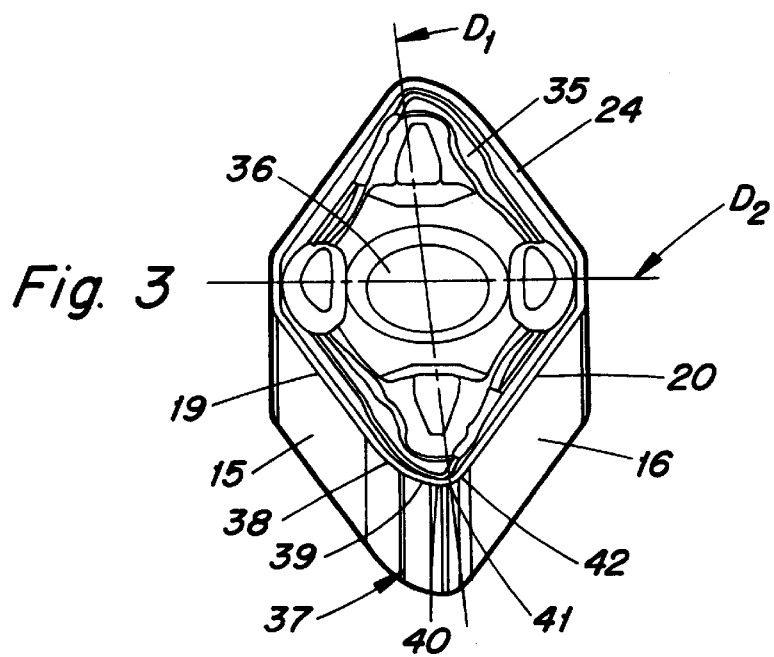
FIG. 3 is a perspective view of the insert in FIG. 1 and 2.

FIGS. 1–3 show a cutting insert for copying turning according to the invention with rhombic basic form and having opposing narrow or nose corners NC which constitute cutting corners. Those nose corners have nose point angles below 60°, e.g., 55°. The cutting insert is generally made of cemented carbide but can also be made of other ceramic materials. The insert comprises flat top and bottom surfaces 11 and 12, which are mutually parallel, and which form a right angle with the edge surfaces, of which three 13, 14 and 15 are shown in FIG. 2. A first pair of side cutting edges 17, 18 converge toward a cutting corner, and a second pair of side cutting edges 19, 20 converge toward an opposite cutting corner. As can be seen in top plan view, those pairs of side cutting edges are separated by mutually parallel edge portions 21, 22. According to an alternative embodiment, however, the insert may be provided with curved convex side surfaces in lieu of the linear edge portions 21, 22. Also the insert can alternatively have a positive basic shape, wherein the side surfaces intersect with the upper planar surface 11 at an acute angle. The side cutting edges 17, 18 of the first pair form equal obtuse angles σ with respective side cutting edges 19, 20 of the other pair. FIG. 3 shows how two edge surfaces 15, 16 extend toward the acute angled corner.

Figure 4:
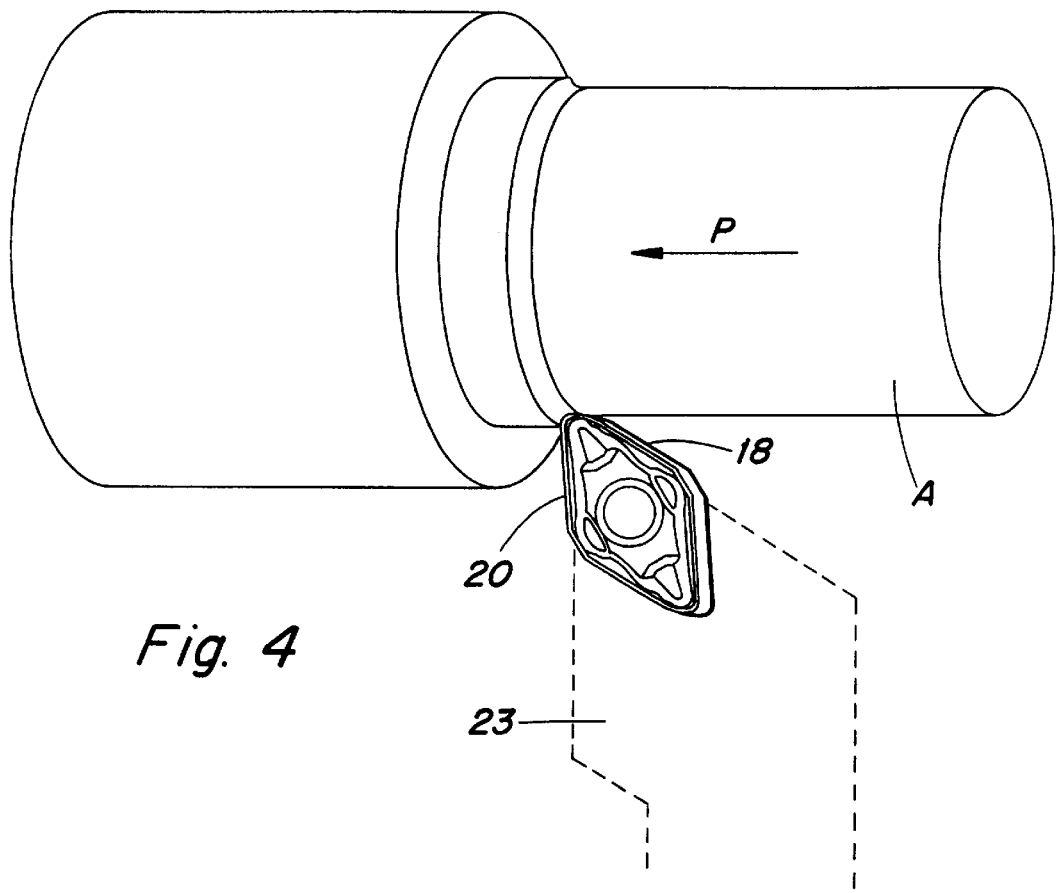
FIG. 4 is a view showing a tool with the cutting insert provided for longitudinal turning of a work piece.
Figure 5:
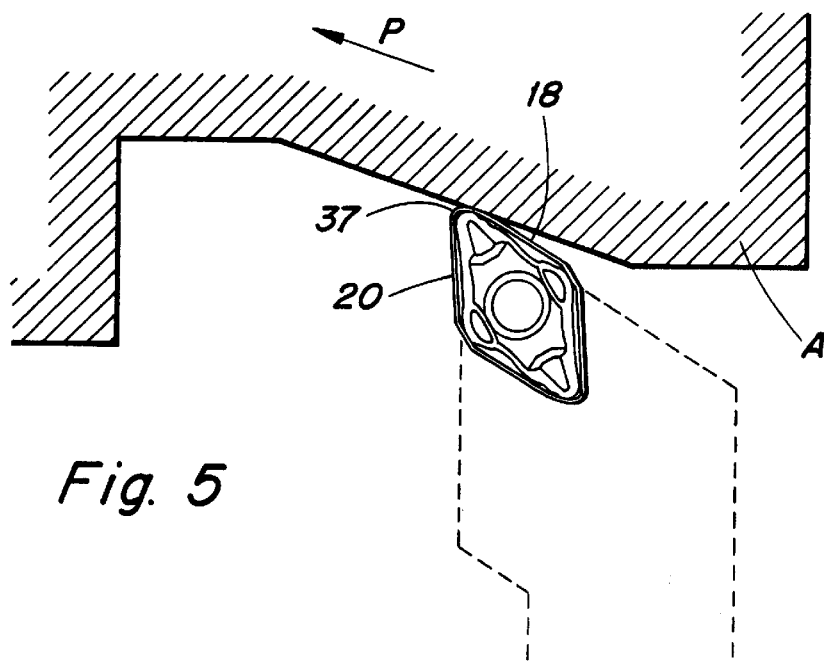
FIG. 5 shows the tool according to FIG. 4 during inwards copying of a work piece.

With the insert in clamped position, as shown in FIG. 4, the edge 17 forms a main cutting edge and edge 18 forms a secondary cutting edge. (When the insert is used for inwards copying, as shown in FIG. 5, the edge 18 becomes the main cutting edge, and the edge 17 becomes the secondary cutting edge.) The edges 17, 18 and 22 in FIG. 4 are located outside the bottom support surface of the tool holder 23 to enable those edges to be brought into cutting engagement with a work piece A. It is to be understood that the cutting insert must be inclined in such manner in FIG. 4, that a sufficient clearance angle is provided along the main and secondary edges 17, 18 and along the edge 22. In this way, the edge 22 becomes useful as an out-copying edge such that when out-facing 90° occurs, a large working allowance can be taken without the need to use particularly long edges 17, 18, 19, 20. Hereby a good chip breaking and guidance of the formed chip when out-facing at 90° is also attained; said chips are otherwise troublesome due to their width and limited thickness.

The cutting insert is provided along all cutting edge portions with a land area 24 with uniform width, which is mainly perpendicular to the edge surface of the cutting insert. The land area extends round the cutting insert in a plane which is parallel with the plane containing all of the cutting edges. The land 24 is intended to serve as edge reinforcement. The land 24 connects inwards towards the cutting insert, to an obliquely downwards inclined surface 25, 26 extending along the side cutting edges, respectively. Located adjacent the out-facing edges 21, 22 at a certain distance from said land 24 in a direction towards the middle of the cutting insert there are respective circle segment-shaped first plateaus 27, 28, the inclined side-walls of which are intended to serve as chip breaking walls.

In this way further improved chip breaking and guidance of the chip obtained during out-facing can be obtained. Also in each acute-angled cutting corner NC at some distance inside of the cutting edge thereof, there is an essentially wedge-shaped projected second plateau 31 or 32, the side-walls 33, 34 of which shall serve as chip breakers. Those plateaus 31, 32 become of narrower width as they approach their respective corners to form the wedge shape as can be seen in top plan view (FIG. 1). Between the inclined surfaces 25, 26 and the side walls 33, 34 of the raised plateau 31 or 32 there remains a recessed surface 35 which is plane-parallel with the plane containing the land area 24. In the center of the cutting insert there is found a central hole 36, intended to receive a suitable tap or center screw (not shown) for the clamping of the cutting insert into its corresponding tool holder 23.

In FIG. 4 it is shown how the cutting insert is used for longitudinal turning clamped in its corresponding tool holder 23, wherein the machining direction is designated with P on the work piece A. In FIG. 5 the cutting insert is used for inwards copying.

A diagonal $D_2$ extending through the center of the hole 36 perpendicularly to the intermediate edges 21 and 22 and bisecting both of the angles σ, forms a right angle with a diagonal $D_3$ passing through the center of the hole 36. According to the invention, the longest diagonal $D_1$ passing through the center of the hole 36 extends at an acute angle in relation to edges 21, 22. Also, $D_1$ forms an acute angle a with the diagonal $D_3$, which means that $D_1$ extends at an angle (90−α) in relation to the diagonal $D_2$. The acute angled corners are designed with an asymmetric nose radius. The transition between the two adjacent edge surfaces 15, 16 forms a curved nose radius surface 37, wherein the intersection line between said upper surface 11 and the edge surfaces 15, 16 and the nose radius surface 37 form cutting edges. This nose surface 37 and the adjoining nose cutting edge (formed by the intersection of the upper surface 11 and the nose radius surface) are divided into a number of circular segments, wherein each pair of adjacent segments always have mutually different radii. The segment located nearest the edge surface 15 forms, at the intersection with the upper surface, an edge segment 38 with radius $R_1$ (see FIG. 6), which is bigger than nose radius $R_2$ of the nearest connecting edge segment 39. It is to be noted that $R_1$ does not always need to be bigger than $R_2$. In certain cases a particular curved nose cutting edge $R_1$ is not needed. The next following edge segment 40 has a radius $R_3$, which always is bigger than $R_2$, whereafter connecting edge segment 41 has a radius $R_4$, which is substantially less than $R_3$, whereafter the next edge segment 42 has a radius $R_5$. The radii $R_5$ and $R_3$ can however suitably be of about the same size. Nose radius edge segments 40 and 42 shall always include therebetween an angle α with the size of about 90°.

Figure 6:
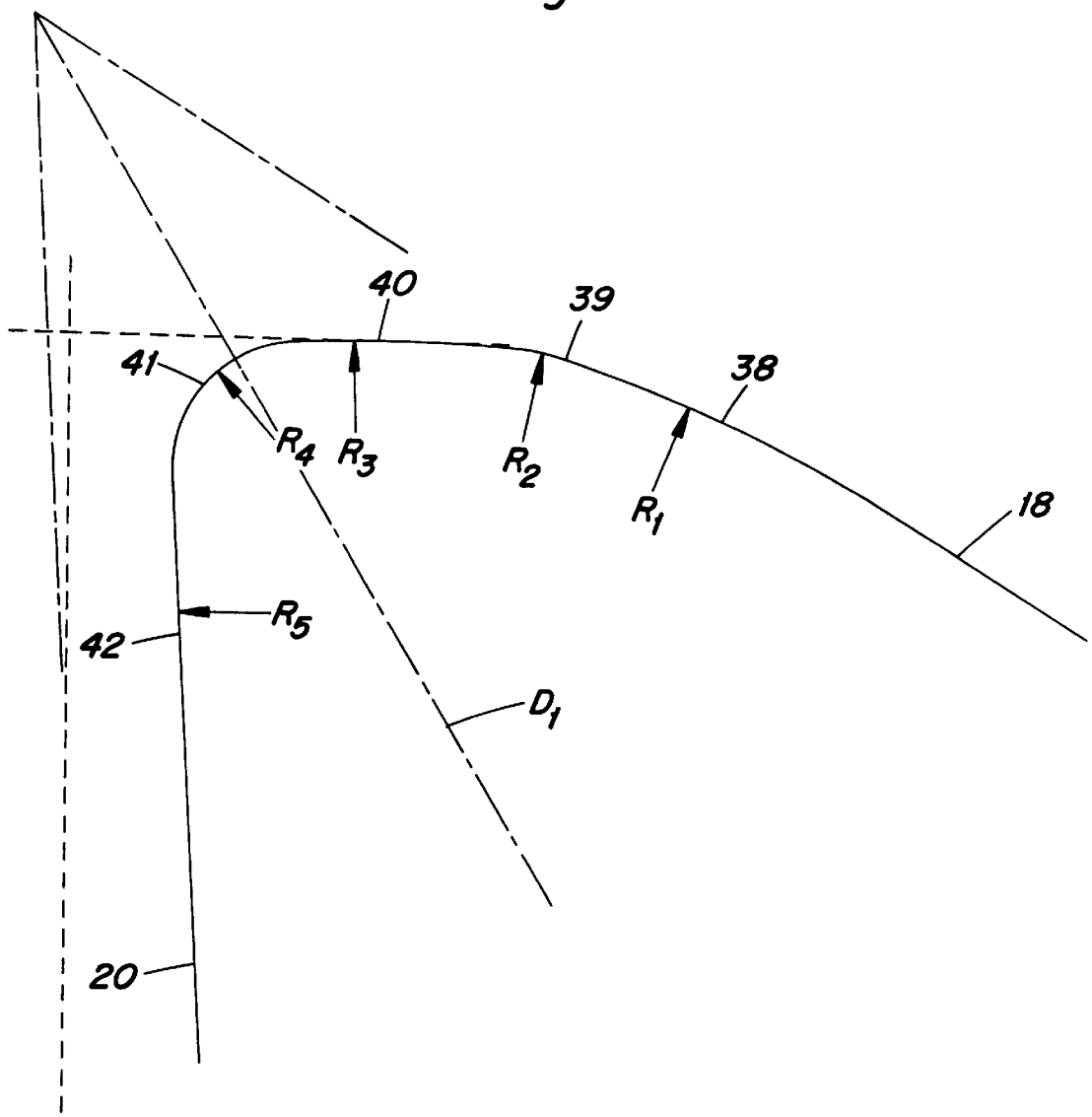
FIG. 6 shows an enlarged detail of the cutting corner of a cutting insert according to FIGS. 1–3.

The longest diagonal D1 defines a line of symmetry of the cutting corner. The edge segments 38, 39, 40 are situated on one side of that line of symmetry, while the corner radius edge segment 42 shall always, in its entirety, be situated on the opposite side of said diagonal $D_1$. This means that diagonal $D_1$ will always pass through the cutting edge segment 41. The cutting edges 38, 39 can, when copying inwards, as is shown in FIGS. 5–6, be regarded as a part of the operative main cutting edge, whereas the cutting edge 42 is a part of the secondary cutting edge 17. During longitudinal turning, according to FIG. 4, however, the cutting edge 17 is the main cutting edge and the cutting edge 18 is the secondary cutting edge. Thanks to the above-indicated differentiation of radii of the nose radius, a surprisingly good surface roughness of the generated surfaces has been obtained in comparison with a similar cutting insert having a corner cutting edge of constant radius. Further, such a cutting insert is found to be less sensitive when there is need for adjustment of the setting angle. Simultaneously it was possible to increased the feed with more than 30%, in certain cases up to about 50%.

Stated another way, the corner edge segment 42 constitutes a first segment situated to one side of the line of symmetry D1; the corner edge segment 40 constitutes a second segment forming an angle of about 90° with the first segment 42; the corner edge segment 41 that is intersected by the line of symmetry D1 constitutes a third segment. $R_3$ and $R_4$ are different from one another; $R_4$ and $R_5$ are different from one another, with $R_5$ being larger than $R_4$. The corner edge segments 38 and 39 constitute fourth and fifth segments, respectively, which join the side cutting edge 18 to the second segment 40.

Figure 7:
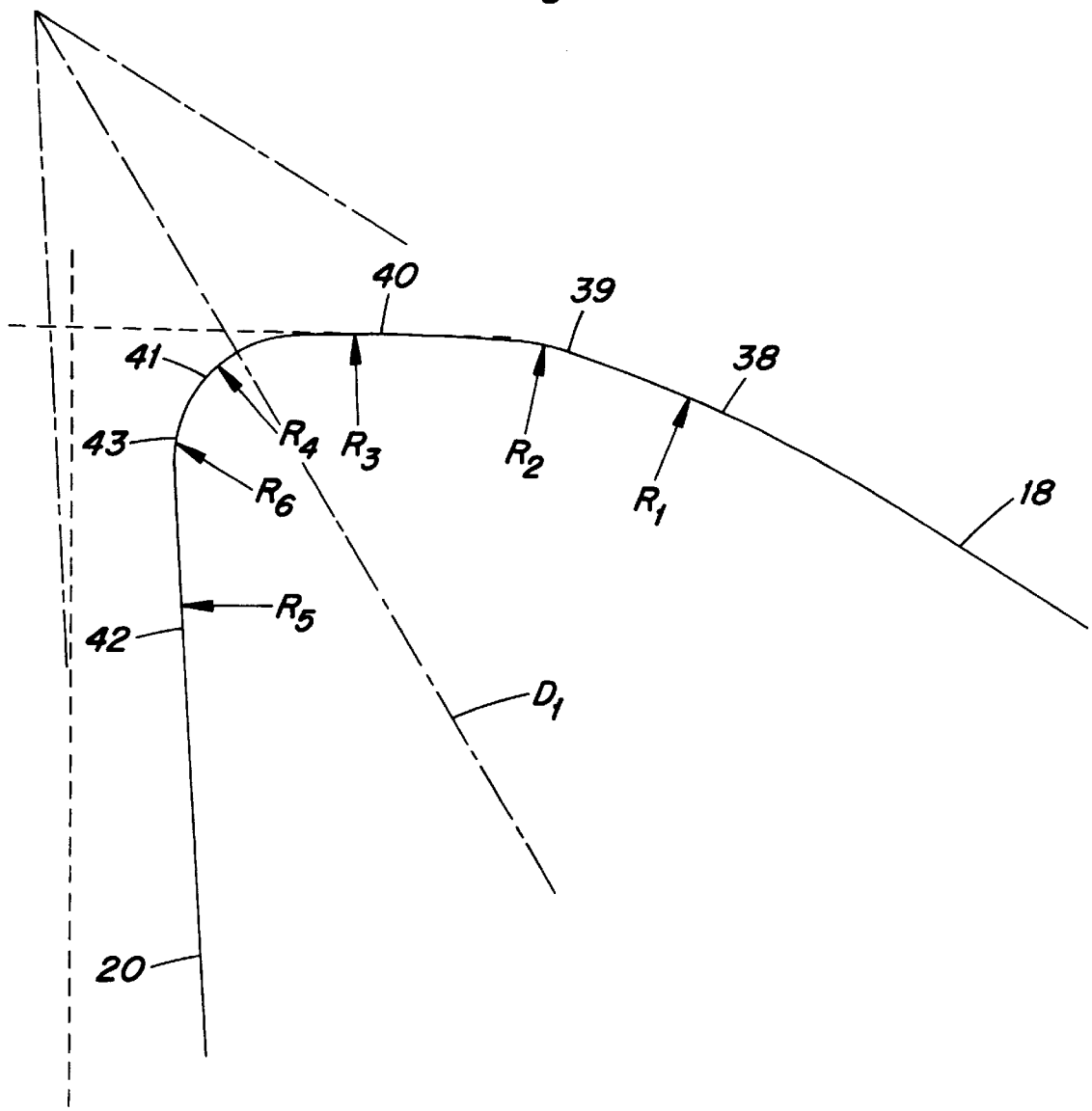
FIG. 7 shows an enlarged detail of the cutting corner of a cutting insert according to an alternative embodiment.

According to an alternative embodiment shown in FIG. 7, a sixth or intermediate edge segment 43 with radius $R_6$ interconnects the edge segments 41 and 42. The segment 43 becomes a part of the side cutting edge 17. The radius $R_6$ is always smaller than radius $R_5$. Radius $R_6$ should also be dimensioned such that it is less than $R_4$. Through this embodiment the cutting insert becomes less sensitive for adjustment of the set angle.

In order to attain optimal chip control the different radii of the corner edges should lie within the following interval:

$R_1$: up to 12 mm, preferably 1–8 mm
$R_2$: up to 5 mm, preferably 0.2–2.5 mm
$R_3$: 1–15 mm, preferably 5–12 mm
$R_4$: 0.2–3.2 mm, preferably 0.4–2.4 mm
$R_5$: 1.2–15 mm, preferably 3–10 mm
$R_6$: 0.1–3 mm, preferably 0.2–0.8 mm Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An indexable cutting insert comprising a body of generally diamond shape, the body including upper and bottom surfaces, and edge surfaces interconnecting the upper and bottom surfaces, the edge surfaces intersecting the upper surface and forming edges therewith, the edges including a first pair of side cutting edges converging toward one another in a first direction at an acute angle less than sixty degrees, and a second pair of side cutting edges converging toward one another in a second direction opposite the first direction at the same acute angle as the first pair of side cutting edges; each of the side cutting edges of the first pair forming an obtuse angle with a respective side cutting edge of the second pair; there being a first curved corner cutting edge interconnecting the first pair of side cutting edges, and a second curved corner edge interconnecting the second pair of side edges; a longest diagonal of the insert constituting a first diagonal which intersects, at an acute angle, a second diagonal which bisects both of the obtuse angles; each of the first and second curved corner cutting edges being asymmetric with respect to a third diagonal extending perpendicular to the second diagonal; the third diagonal being shorter than each of the first diagonal and the longest diagonal; each of the first and second curved corner cutting edges comprising a first curved cutting edge segment disposed on a first side of the first diagonal and defined by a first constant radius of curvature, a second curved cutting edge segment disposed on a second side of the first diagonal and defined by a second constant radius of curvature, a third curved cutting edge segment intersected by the first diagonal and defined by a third constant radius of curvature; and fourth and fifth curved cutting edge segments disposed on the first side of the first diagonal and defined by fourth and fifth constant radii of curvature, respectively; the second radius of curvature being larger than the third radius of curvature; and one of the fourth and fifth radii of curvature being larger than the third radius of curvature.

2. The indexable insert according to claim 1 wherein the third cutting edge segment is situated farthest away from a center of the insert.

3. The indexable cutting insert according to claim 1 wherein the first and second cutting edge segments together form an angle of about 90 degrees.

4. The indexable cutting insert according to claim 3 wherein the fourth edge segment is connected to one of the side cutting edges and being of larger radius than the fifth edge segment which is connected to the first corner edge segment.

5. The indexable cutting insert according to claim 3 further including an intermediate corner edge segment disposed to the second side of the first diagonal and interconnecting the second and third corner edge segments, the radius of the second corner edge segment being larger than a radius of the intermediate corner edge segment.

6. The indexable cutting insert according to claim 1 wherein the edge surfaces form right angles with the upper and bottom surfaces, there being a raised plateau formed inside of each of the corner cutting edges to define a chip breaker.

7. The indexable cutting insert according to claim 6 wherein each plateau becomes narrower in width toward the corner cutting edge to define a wedge shape as the insert is viewed along a line of sight perpendicular to the upper surface of the insert.

8. The indexable cutting insert according to claim 1 wherein the insert includes a reinforcing land extending around the perimeter of the insert inside of the side cutting edges and the corner cutting edges.

* * * * *